United States Patent
Gavrilets et al.

(10) Patent No.: US 10,247,573 B1
(45) Date of Patent: Apr. 2, 2019

(54) GUIDANCE SYSTEM AND METHOD FOR LOW VISIBILITY TAKEOFF

(71) Applicant: Rockwell Collins, Inc., Cedar Rapids, IA (US)

(72) Inventors: Vladislav Gavrilets, McLean, VA (US); Douglas A. Bell, Marion, IA (US); Paul J. Ronan, Highland, NY (US); Patrick Y. Hwang, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 15/473,438

(22) Filed: Mar. 29, 2017

(51) Int. Cl.
| | |
|---|---|
| G01C 23/00 | (2006.01) |
| G01C 21/16 | (2006.01) |
| B64C 25/42 | (2006.01) |
| B64D 31/00 | (2006.01) |
| B64D 47/08 | (2006.01) |
| B64D 43/00 | (2006.01) |
| G01S 19/13 | (2010.01) |

(52) U.S. Cl.
CPC ............ G01C 23/005 (2013.01); B64C 25/42 (2013.01); B64D 31/00 (2013.01); B64D 43/00 (2013.01); B64D 47/08 (2013.01); G01C 21/165 (2013.01); G01S 19/13 (2013.01)

(58) Field of Classification Search
CPC ........ G01C 23/005; B64C 25/42; G06F 19/00
See application file for complete search history.

(56) References Cited

U.S. PATENT DOCUMENTS

| | | | | |
|---|---|---|---|---|
| 4,368,517 A | * | 1/1983 | Lovering | G01C 23/005 340/972 |
| 5,574,650 A | * | 11/1996 | Diesel | G01C 21/16 701/505 |
| 5,774,826 A | * | 6/1998 | McBride | G01S 19/42 342/357.29 |
| 5,984,229 A | * | 11/1999 | Hollowell | B64C 15/02 244/109 |
| 6,414,629 B1 | * | 7/2002 | Curcio | B63C 9/0005 342/357.52 |
| 6,577,952 B2 | * | 6/2003 | Geier | G01C 21/165 340/939 |

(Continued)

OTHER PUBLICATIONS

Young, Ryan S. Y. and Gary A. McGraw, "Fault Detection and Exclusion Using Normalized Solution Separation and Residual Monitoring Methods", Navigation: Journal of the Institute of Navigation, vol. 50, No. 3, Fall 2003, pp. 151-169.

*Primary Examiner* — Alex C Dunn
(74) *Attorney, Agent, or Firm* — Donna P. Suchy; Daniel M. Barbieri

(57) ABSTRACT

Systems and methods for navigation of a vehicle use a processing system. The systems and methods can allow an aircraft to take-off in low visibility conditions. The processing system includes a cross tracker, an error processor and an error estimator. The cross tracker is configured to determine a cross track deviation using a hybrid positon and runway heading data. The error processor is configured to determine the hybrid positon from inertial reference system data and corrected error data, and the error estimator is configured to provide the corrected error data using estimates derived from delta range data from a global navigation satellite system receiver.

20 Claims, 10 Drawing Sheets

(56) References Cited

U.S. PATENT DOCUMENTS

| | | | | | |
|---|---|---|---|---|---|
| 7,219,013 | B1* | 5/2007 | Young | | G01C 21/165 |
| | | | | | 342/357.58 |
| 7,962,255 | B2* | 6/2011 | Krogh | | G01C 21/165 |
| | | | | | 701/1 |
| 8,560,149 | B1* | 10/2013 | Ganguli | | G01C 23/005 |
| | | | | | 701/15 |
| 8,630,756 | B2* | 1/2014 | Fleiger-Holmes | | G01S 1/18 |
| | | | | | 342/33 |
| 8,849,481 | B1 | 9/2014 | Gavrilets et al. | | |
| 8,949,011 | B2* | 2/2015 | Ford | | G01C 21/165 |
| | | | | | 342/33 |
| 9,257,050 | B2* | 2/2016 | Fleiger-Holmes | | G01S 1/18 |
| 9,285,480 | B2* | 3/2016 | Lebrat | | G01S 19/20 |
| 9,772,712 | B2* | 9/2017 | Kneuper | | G08G 5/0052 |
| 2005/0230529 | A1* | 10/2005 | Towne | | B64C 30/00 |
| | | | | | 244/35 R |
| 2008/0140315 | A1* | 6/2008 | Krogh | | G01C 21/165 |
| | | | | | 701/5 |
| 2010/0312461 | A1* | 12/2010 | Haynie | | B61L 25/025 |
| | | | | | 701/117 |
| 2011/0156954 | A1* | 6/2011 | Roh | | G01S 19/22 |
| | | | | | 342/357.69 |
| 2011/0282580 | A1* | 11/2011 | Mohan | | G01C 21/005 |
| | | | | | 701/472 |
| 2012/0265376 | A1* | 10/2012 | Fleiger-Holmes | | G01S 1/18 |
| | | | | | 701/16 |
| 2014/0207314 | A1* | 7/2014 | Kou | | B64D 43/00 |
| | | | | | 701/14 |
| 2015/0352952 | A1* | 12/2015 | Kneuper | | B60K 35/00 |
| | | | | | 701/36 |
| 2016/0084655 | A1* | 3/2016 | Roberfroid | | G05B 9/03 |
| | | | | | 701/468 |
| 2016/0223683 | A1* | 8/2016 | Boyarski | | G01S 19/40 |
| 2016/0290825 | A1* | 10/2016 | Brenner | | G01S 19/54 |

* cited by examiner

GUIDANCE SYSTEM AND METHOD FOR LOW VISIBILITY TAKEOFF

BACKGROUND

Vehicles (e.g., manned aircraft and unmanned aerial vehicles (UAVs)) operating in low visibility conditions often require navigation and guidance information. For example, manned aircraft taking off in low visibility conditions (below 600 foot (ft.) runway visual range (RVR)) often require a Category II or III instrument landing system (ILS) at the airport. The Cat II and III ILS are ground infrastructure equipment which are very expensive to install and maintain. Only 80-90 airports in the US have this equipment. Thus, when conditions below 600 ft. RVR occur at the vast majority of regional airports where Cat II or III equipment are not available, the number of aircraft that can takeoff from those airports is drastically reduced to zero which creates a domino delay effect, as all subsequent flights of the affected aircraft scheduled for the next several hours or the remainder of the day are canceled or delayed.

U.S. Pat. No. 8,849,481, entitled "GPS Carrier-phase Based Relative Navigation," incorporated herein by reference in its entirety and assigned to the assignee of the present application discusses the use of GPS carrier phase relative navigation to provide guidance for unmanned aircraft takeoff.

RTCA, Incorporated has published document DO-229D which contains minimum operational performance standards (MOPS) for aircraft navigational equipment (2D and 3D) using the Global Positioning System (GPS).

The aviation industry is in the process of developing performance requirements to use an Enhanced Flight Vision System (EFVS) as a visual aid to the flight crew for taxi from the gate to the runway where take-off is contemplated. The performance requirements will also include the integrity requirements for using the EFVS for take-off, as well. The integrity requirements to support take-off with an EFVS will likely be 2 to 3 orders of magnitude higher than the taxi requirements. It is not possible for a single EFVS to meet the higher integrity requirements. To meet the integrity requirements for take-off high integrity guidance and navigation system as described herein can be used to augment and/or monitor the EFVS image positioning by becoming the image positioning system for a synthetic image representing the take-off runway and its center line. The synthetic image may be over laid on or combined with the EFVS image to allow the flight crew to compare both images full time thereby validating both images agree and can then be used to support take-off in low visibility.

SUMMARY

In one aspect, embodiments of the inventive concepts disclosed herein relate to a method of taking off from a runway in low visibility conditions. The method includes visually confirming a position of a nose wheel of an aircraft laterally within 1 meter of a centerline of the runway, and determining a runway vector heading for the runway from runway data. The method also includes comparing the runway vector heading to a heading indication from a singular or plurality of inertial reference systems, determining delta range measurements from global navigation satellite system, and setting an initial takeoff position for each inertial reference system to a position of the centerline associated with survey at a location of the aircraft during the visually confirming the positon prior to takeoff.

In a further aspect, embodiments of the inventive concepts disclosed herein relate a navigation system. The navigation system includes a processing system configured to determine a first navigation solution and second navigation solution. The first navigation solution provides a first horizontal deviation using a first inertial reference system and a first global navigation satellite system receiver, and the second navigation solution provides a second horizontal deviation using a second inertial reference system and a second global navigation satellite system receiver. The first navigation solution and the second navigation solution determine a position derived from the respective first and second inertial reference system and an error prediction derived from at least one of the global navigation satellite system receivers to calculate the first horizontal deviation and the second horizontal deviation.

In a still further aspect, embodiments of the inventive concepts disclosed herein relate to a processing system for a navigation system. The processing system includes a cross tracker, an error processor and an error estimator. The cross tracker is configured to determine a cross track deviation using a hybrid relative positon, runway heading data and a database of the take-off runway (runway end points). The error processor is configured to determine the hybrid positon from inertial reference system data and corrected error data, and the error estimator is configured to provide the corrected error data using estimates derived from delta range measurement data from a global navigation satellite system receiver.

BRIEF DESCRIPTION OF FIGURES

Exemplary embodiments of the inventive concepts disclosed herein are described with reference to the accompanying drawings, wherein like numerals denote like elements, and.

DETAILED DESCRIPTION

Figure 1:
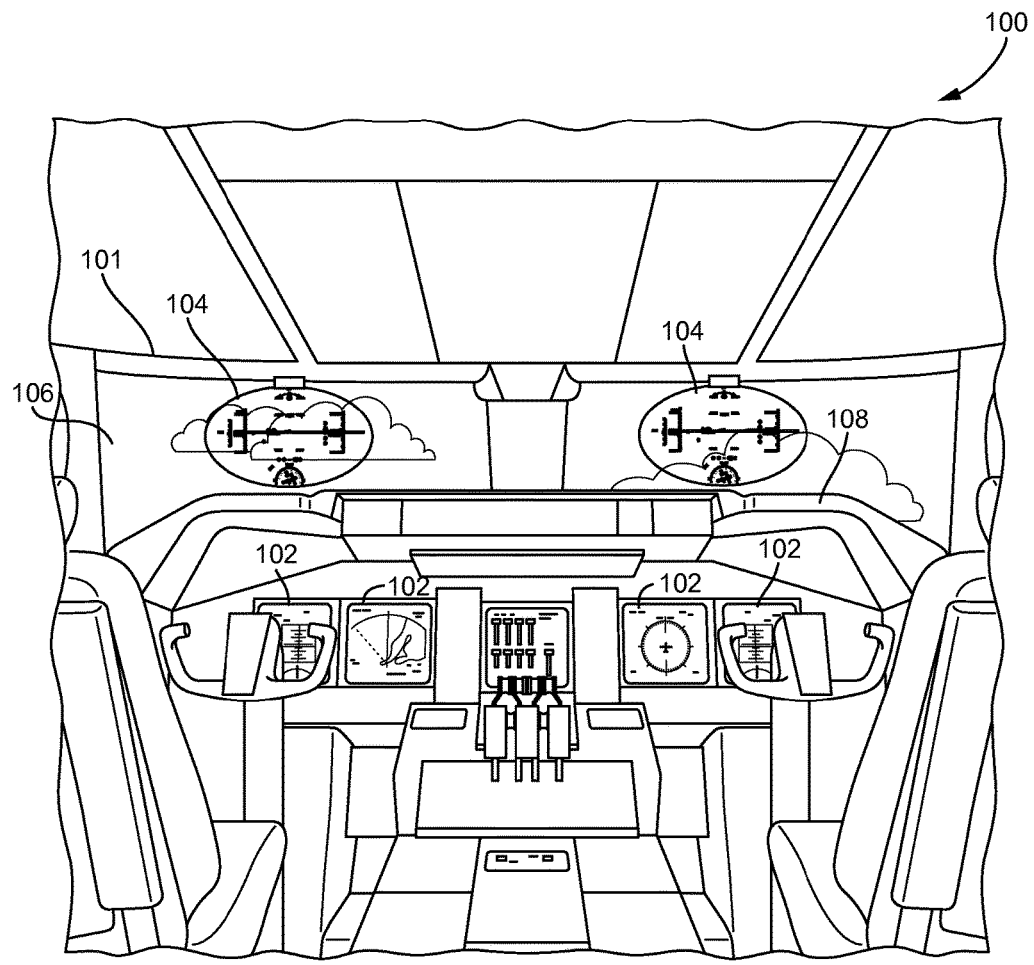
FIG. 1 is a perspective view schematic drawings of an exemplary aircraft cockpit or cockpit for an aircraft according to some embodiments.

Before describing embodiments of the inventive concepts disclosed herein in detail, it should be observed that the inventive concepts disclosed herein include, but are not limited to, a novel structural combination of components and not in the particular detailed configurations thereof. Accordingly, the structure, methods of manufacture and use, functions, control and arrangement of components have been illustrated in the drawings by readily understandable block representations and schematic drawings, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Vehicles (e.g., manned aircraft and UAVs) utilize global navigation satellite system (GNSS) (e.g., Global Positioning System (GPS)) carrier phase or delta range relative navigation to provide guidance for aircraft takeoff or other operations. The navigation system and procedure provides sufficient accuracy and integrity for takeoff in low visibility conditions (below 600 foot runway visual range) without ILS Category II or III and runway centerline lighting. In some embodiments, two-dimensional and/or three-dimensional navigation and guidance operations (e.g. takeoffs and/or landings from a runway) are provided. In some embodiments, the navigation system and procedure is performed using head up display (HUD) equipment. In some embodiments, a high accuracy, high integrity method and system for computing aircraft position relative to the runway centerline uses GNSS carrier phase or delta range time relative navigation.

In some embodiments, a high accuracy, high integrity method and system for computing aircraft position relative to the runway centerline does not require any ground infrastructure and works with existing avionics equipment (e.g., HUD, Head Down Display, inertial reference system (IRS), and GPS receivers). In some embodiments, a high accuracy, high integrity method and system for computing aircraft position relative to the runway centerline advantageously provides a ten times improvement in horizontal protection level to about 4 meters from the horizontal protection level of 40 meters achievable with space-based augmentation systems such as Wide Area Augmentation System. In some embodiments, a high accuracy, high integrity method and system for computing aircraft position relative to the runway centerline is compliant with most relevant MOPS (e.g., DO-229D, Appendix F) regarding calculation of GNSS velocity (namely, using delta ranges instead of carrier phase measurements to calculate an entity similar to velocity, i.e. relative position).

Referring now to FIG. 1, an exemplary aircraft cockpit 100 is shown. Aircraft cockpit 100 for an aircraft 101 can include various equipment used by the aircraft's pilot to increase visual range, enhance the pilot's situational awareness, and control the aircraft 101. As shown, the aircraft cockpit 100 includes flight displays 102 and HUDs 104. The HUDs 104 are located within aircraft cockpit 100 such that the HUDs 104 is directly within the pilots' field of vision when looking through windshield 106 of the aircraft. The flight displays 102 are head down displays (HDDs). The flight displays 102 and/or the HUDs 104 can be in communication with processing electronics of an EFVS and may be configured to display, for example, EFVS imagery of structures in an airport terminal or runway environment.

Figure 2:
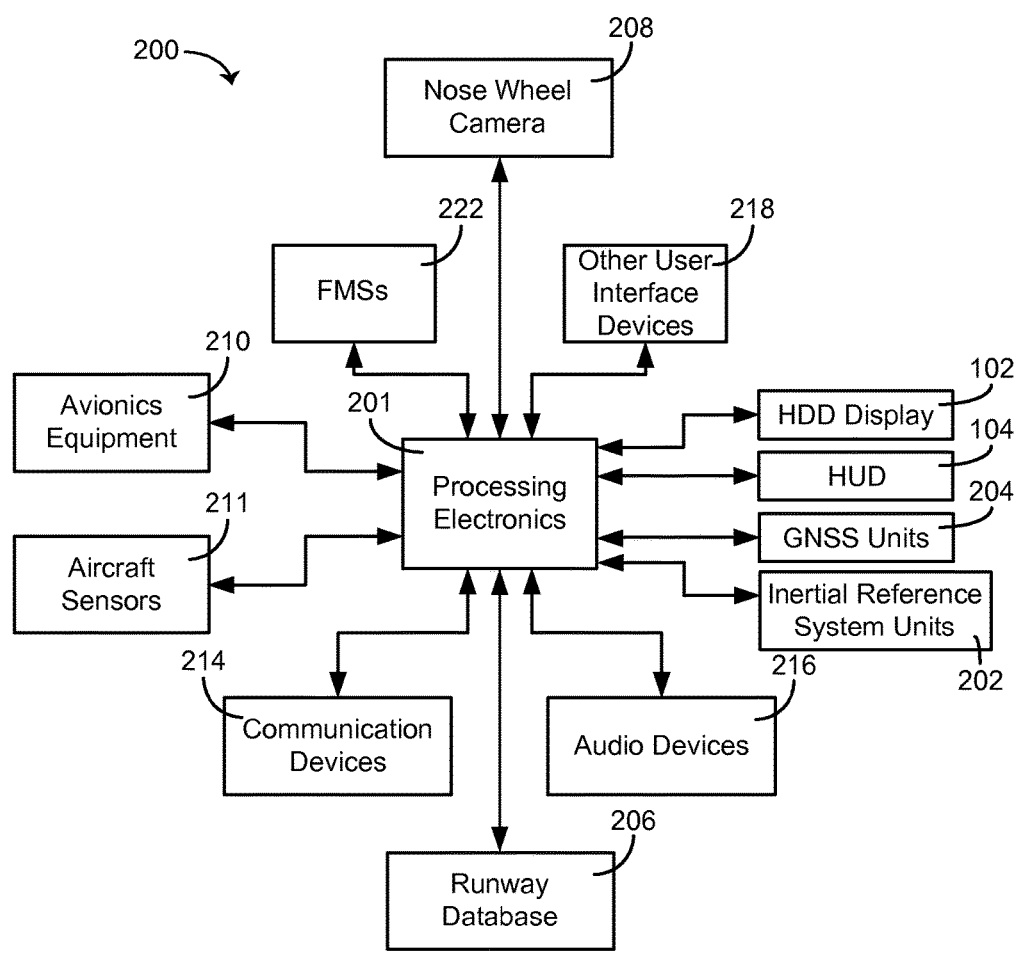
FIG. 2 is a block diagram of a navigation system for the aircraft cockpit illustrated in FIG. 1 according to some embodiments.

With reference to FIG. 2, the HUDs 104 and/or the displays 102 provide high accuracy, high integrity estimate of aircraft position on the runway and perform a take-off operation in low visibility conditions. A guidance or navigation system 200 on board the aircraft 101(FIG. 1) is configured to provide data regarding the state of the aircraft 101 to the flight displays 102 and/or the HUDs 104. For example, data regarding the aircraft's altitude, heading, velocity, runway information, position information, deviation from a takeoff path, etc., are provided to the flight displays 102 and/or the HUDs 104 by processing electronics 201 of the navigation system 200.

The processing electronics 201 are part of the navigation system 200 or can be part of an EFVS, a flight management system (FMS), or other aircraft electronics in some embodiments. The processing electronics 201 are further configured to provide data regarding the external surroundings of the aircraft to flight displays 102 and/or HUDs 104 in some embodiments. The data may also be provided to the displays 102 and HUDs 104 in the context of an aircraft situation display, such as a horizontal situation indicator or a vertical situation display including an electronic moving map.

With reference to FIG. 2, the navigation system 200 includes the processing electronics 201, inertial reference system (IRS) units 202, global navigation satellite systems (GNSS) receiver units 204, and a runway database 206. The navigation system 200 is a time relative navigation system in some embodiments. The processing electronics 201 uses aircraft state estimate from the IRS units 202, aircraft position estimate and delta range measurements from the GNSS receiver units 204, and runway information from the runway database 206 to provide a navigation solution. The navigation solution can be used for positioning operations for a synthetic vision system image.

The processing electronics 201 include one or more circuits configured to process received data and to output data based on the processed data. The processing electronics 201 can receive data from, or provide data to, any number of the aircraft's electronic devices. The processing electronics 201 can be in communication with onboard systems configured to generate data regarding the aircraft and its surroundings. For example, processing electronics 201 are in communication with an avionics equipment 210, aircraft sensors 211, communication devices 214, audio devices 216, and user interface devices 218, flight management systems (FMSs) 222. The communication devices 214 are configured to receive data regarding another aircraft from an external source, such as a ground-based communications system (e.g., air traffic control, etc.), a satellite-based communications system, or from the other aircraft equipment. In some embodiment, the processing electronics 201 transmits data via communication devices 214, such as a request for data regarding nearby aircraft and data related to runway position, dimensions, and survey information (latitude, longitude, altitude, runway length, centerline position, end positons, etc.).

The aircraft sensors 211 are any number of sensors that measure aircraft parameters related to the state of the aircraft. For example, aircraft sensors 211 may include temperature sensors, humidity sensors, infrared sensors, altitude sensors, pressure sensors, fuel gauges, airspeed sensors, throttle position sensors, ground speed sensors, pitot-static tubes, a gyroscope, a global positioning system (GPS), a camera (e.g., an infrared camera, a microwave camera, etc.), or any other aircraft-mounted sensors that may be used to provide data to the processing electronics 201. It should be appreciated that sensors 211 (or any other component shown connected to the processing electronics 201) may be indirectly or directly connected to the processing electronics 201.

The avionics equipment 210 can include other electronic control systems in the aircraft. For example, avionics equipment 210 may include a full authority digital engine control (FADEC), a backup navigation system, or another aircraft system configured to provide inputs to processing electronics 201. For example, avionics equipment 210 includes the landing gear system of the aircraft which provides information such as whether or not the landing gear is deployed, a weight on wheels determination, or other parameters to processing electronics 201. In another example, avionics equipment 210 provides controls inputs, such as a desired throttle or power level to processing electronics 201.

The processing electronics 201 are in communication with the displays 102 and/or the HUDs 104. The processing electronics 201 generate a 2-D or 3-D representation of an airport terminal or runway environment in front of the aircraft from the viewing perspective of the pilot and provide the representation to the displays 102 and/or the HUDs 104. The rendition may also include various indicia regarding the current state of the aircraft. For example, the rendering on displays 102 and HUDs 104 includes data regarding the aircraft's heading, course, altitude, and deviation from intended take-off path, abort messages, or the like.

The runway database 206 stores information regarding the runway and also can store additional information, for example, a terrain database that may include a terrain elevation database, an obstacle location and elevation database, an aerodrome mapping database, an electronic charts and maps database, etc. The runway database 206 is used by the processing electronics 201 to generate aircraft situational displays of the aircraft's surroundings, such as during approach and landing procedures. The runway database is an electronic memory, a disk storage unit, or other storage device in some embodiments.

A nose wheel camera 208 can be situated to provide an image of the nose wheel of the aircraft 101 and the ground. The image from the nose wheel camera 208 allows the pilot to verify nose wheel positon with respect to runway position. The nose wheel camera 208 is an infrared or visual light camera in some embodiments. The nose wheel camera 208 is optional and not required or necessary for the system and methods described herein.

Figure 3:
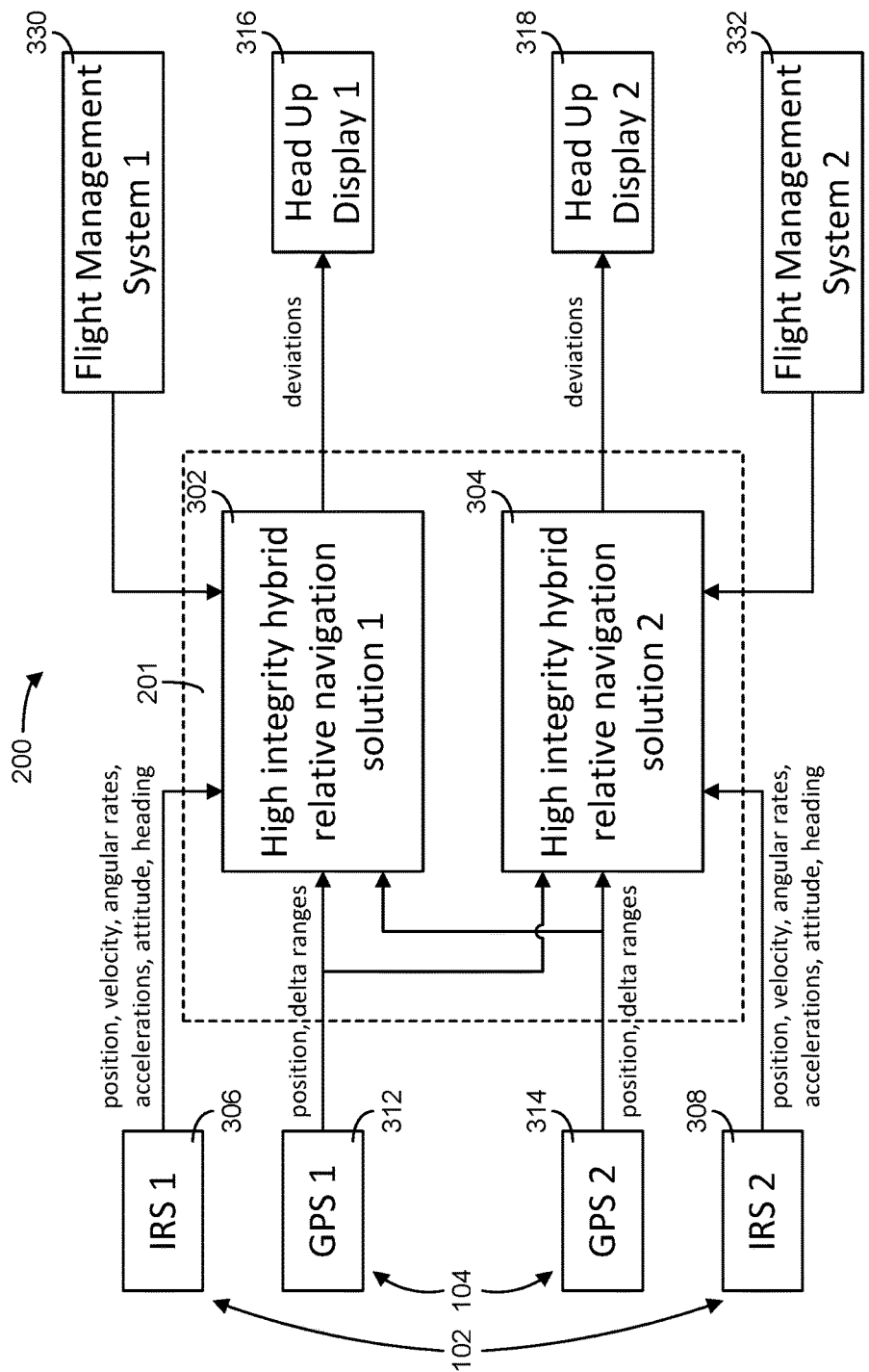
FIG. 3 is a block diagram of a processing system for the navigation system illustrated in FIG. 2 according to some embodiments.

With reference to FIG. 3, the processing electronics 201 includes a memory and processor for implementing a high integrity hybrid relative navigation solution module 302 and a high integrity hybrid relative navigation solution module 302. The processor can be or include, one or more microprocessors, application specific integrated circuits (ASICs), circuits containing one or more processing components, a group of distributed processing components, circuitry for supporting a microprocessor, or other hardware configured for processing. According to an exemplary embodiment, the processor is configured to execute computer code stored in memory to complete and facilitate the operations of the high integrity hybrid relative navigation solution module 302 and high integrity hybrid relative navigation solution module 302 described herein. The memory is any volatile or non-volatile computer-readable storage medium capable of storing data or computer code relating to the activities described herein.

The processing electronics 201 are coupled to inertial reference system units 306 and 308, GPS receiver units 312 and 314, a HUD 316, a HUD 318, an FMS 330 and an FMS 332. HUDs 316 and 318 correspond to the HUDs 104 in FIG. 1, and the GPS receiver units 312 and 314 correspond to the GNSS receiver units 204 in FIG. 2. The high integrity hybrid relative navigation solution module 302 receives position, velocity, angular rate, acceleration, attitude and heading information from the IRS unit 306 and runway endpoint and command signals from the FMS 330. The FMSs 330 and 332 are similar to the FMSs 222 and include a runway database similar to the runway database 206 (FIG. 2) in some embodiments. The high integrity hybrid relative navigation solution module 302 also receives position and delta range information from the GPS unit 312 and provides deviations to the HUD 316 for providing guidance to the pilot.

The high integrity hybrid relative navigation solution module 304 is similar to high integrity hybrid relative navigation solution module 302 and receives position, velocity, angular rate, acceleration, attitude and heading information from IRS unit 308, position and delta range information from GPS unit 314, and runway endpoint information and command signals from the FMS 332. The high integrity hybrid relative navigation solution module 304 provides deviations to the HUD 318. The high integrity hybrid relative navigation solution module 302 also receives position and delta range information from the GPS unit 314, and the high integrity hybrid relative navigation solution module 304 also receives position and delta range information from the GPS unit 314.

High integrity hybrid relative navigation solution modules 302 and 304 can be utilized to provide low visibility takeoff guidance. In some embodiments, the high integrity hybrid relative navigation solution modules 302 and 304 are configured to calculate horizontal cross track error from the time differenced carrier phase or from integrated delta range using receiver autonomous integrity monitoring (RAIM) fault detection and exclusion (FDE) processing and horizontal cross track velocity using RAIM FDE processing. The FDE RAIM for horizontal cross track error is calculated using a modified pseudo range FDE RAIM algorithm applied to time differenced carrier phase measurements or to integrated delta range measurements in some embodiments. The uncertainty of each to time differenced carrier phase or integrated delta range measurement grows with time due to uncertainty in satellite clock drift, about 2 mm/sec root means square (RMS). This will be the largest source of error in time differenced carrier phase measurement at lift off in a fault free case, yielding 8 cm RMS in some embodiments. The FDE RAIM for horizontal cross velocity is calculated using a modified velocity FDE RAIM algorithm adjusted to yield cross track velocity protection level in some embodiments.

The high integrity hybrid relative navigation solution modules 302 and 304 can include a tightly coupled hybrid filter and fault detection logic based on solution separation of hybrid filters in some embodiments. The tightly coupled hybrid filter can be a tightly coupled Kalman filter with measurements and residuals representing time differenced range between GPS antenna and satellite. The high integrity hybrid relative navigation solution modules 302 and 304 can also include optional fault exclusion logic based on residual monitoring. This operation can be eliminated to reduce processing time in some embodiments.

Figure 4:
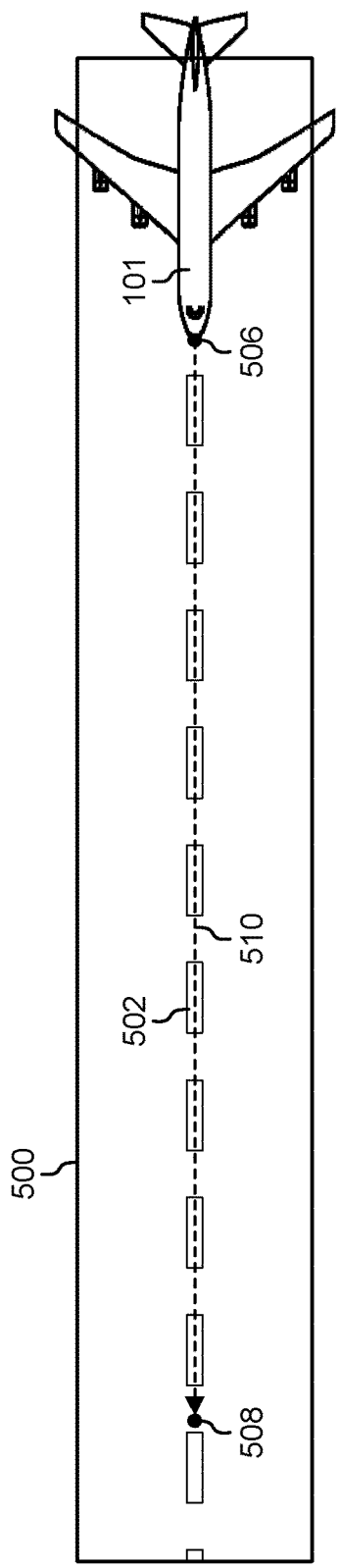
FIG. 4 is a top view schematic drawing of an aircraft on a runway using the navigation system illustrated in FIG. 2.

Referring to FIG. 4, prior to an attempted takeoff for the aircraft 101, a survey of a runway 500 is taken. The survey can use a global navigation satellite system (GNSS) receiver to sample signals from one or more GNSS satellites at a first position 506 (e.g., a takeoff start point on a runway centerline 502 at one end of the runway 500) and a second position 508 (e.g. a position at the other end of the runway 500 on the runway centerline 502). A runway vector 510 connecting the first position 506 and the second position 508 is computed from the GNSS measurements gathered at first position 506 and the second position 508.

In some embodiments, the survey of the runway 500 may employ time-relative positioning techniques to determine coordinates of the runway vector 510 connecting two positions (e.g. the first position 506 at one end of the runway 500 and the second position 508 at the other end of the runway 500). Other techniques can be used to survey the runway data and provide runway data to the navigation system 200. The surveyed runway data can be stored in the runway database 206 or the FMSs 330 or 332.

As noted in U.S. Pat. No. 5,999,123, a measurement equation for the carrier phase associated with a given GNSS satellite may be described mathematically as:

$$\Phi(t_k) - \Phi(t_0) = [r_k + N] - [r_0 + N] \quad \text{Eqn. 1}$$

which is equivalent to:

$$[\Phi(t_k) - \Phi(t_0)] - [d(x^*, t_k) - d(x^*, t_0)] = h(t_k) \cdot [x(t_k) - x^*] - h(t_0) \cdot [x(t_0) - x^*] \quad \text{Eqn. 2}$$

where:
$\Phi(t_k)$ is a carrier phase detected at a first time/position $t_k$ (e.g. a second position 508);
$\Phi(t_0)$ is a carrier phase detected at a second point time/position to (e.g. a first position 506);
$r_k$ is a range plus range bias at $t_k$;
$r_0$ is a range plus range bias at $t_0$
N is an integer cycle ambiguity;
$h(t_k)$ are the direction cosines at $t_k$;
$h(t_0)$ are the direction cosines at $t_0$;
$x(t_k)$ is the position and range bias errors at $t_k$
$x(t_o)$ is the position and range bias error at $t_0$ (range bias error may be arbitrarily set to 0 at $t_0$);
x* is a true position at $t_0$;
$d(x^*, t_k)$ is a geometric range from x* to a given GNSS satellite plus deterministic biases at $t_k$; and
$d(x^*, t_0)$ is a geometric range from x* to a given GNSS satellite plus deterministic biases at $t_0$.

Written in a different way Eqn. 1 may be characterized as:

$$[\Phi(t_k) - \Phi(t_0)] - [d(x^*, t_k) - d(x^*, t_0)] = h(t_k) \cdot [x(t_k) - x(t_0)] + [h(t_k) - h(t_0)] \cdot [x(t_0) - x^*] \quad \text{Eqn. 3}$$

The second term on the right-hand side representing the assumed position error $[x(t_0) - x^*]$ may be ignored as no change in the term would be observable over a short time interval (e.g. 100 seconds). In addition, $(h(t_k) - h(t_0))$, is very nearly zero so its contribution is also small over a short time interval. Thus, ultimate solution of Eqns. 2 and 3, consists of solving for the term $[x(t_k) - x(t_0)]$.

Additionally, if the carrier phase observation and deterministic biases are incorporated into the term carrier phase $\Phi(t)$, where $\Phi(t) = \Phi(t) - d(x^*, t)$ then Eqn. 2 reduces to:

$$[\Phi(t_k) - \Phi(t_0)] = h(t_k) \cdot [x(t_k) - x(t_0)] \quad \text{Eqn. 4}$$

Once the carrier phase and direction cosine values for each of a group of GNSS satellites (e.g. a group of at least 4 satellites) is known for the first position 506 and the second position 508, the solutions for the relative position differences $[x(t_k) - x(t_0)]$ between the first position 506 and the second position 508 may be computed by solving Eqn. 4 for the set of GNSS satellites, simultaneously, as follows (where $x_1$ $x_2$ and $x_3$ are position components and $x_4$ is range bias):

$$\begin{bmatrix} x_1(t_k) - x_1(t_0) \\ x_2(t_k) - x_1(t_0) \\ x_3(t_k) - x_3(t_0) \\ x_4(t_k) - x_4(t_0) \end{bmatrix} = \quad \text{Eqn. 5}$$

$$(H^T H)^{-1} H^T \cdot \begin{bmatrix} \varphi_1(t_k) - \varphi_1(t_0) \\ \varphi_2(t_k) - \varphi_2(t_0) \\ \varphi_3(t_k) - \varphi_3(t_0) \\ \varphi_4(t_k) - \varphi_4(t_0) \\ \vdots \end{bmatrix} \text{where } H = \begin{bmatrix} h_1(t_k) \\ h_2(t_k) \\ h_3(t_k) \\ h_4(t_k) \\ \vdots \end{bmatrix}$$

A mathematically equivalent calculation of relative position can be performed with delta range measurements from each observable satellite integrated over time, since time differenced carrier phase measurement is mathematically equivalent to integrated delta range measurements. U.S. Pat. No. 5,999,123 shows a method of computing relative position using time differenced carrier phase measurements, and applying the resulting relative position to provide cross takeoff guidance, for example. Relative position can be computed using integrated delta ranges. Integrated delta ranges are used in civil aircraft navigation equipment instead of time differenced carrier phase. (Minimum Operating Performance Standards document DO-229D Appendix F calls for using delta ranges instead of time differenced carrier phase to be used for calculating aircraft velocity) Velocity is similar in nature to relative position.

Figure 5:
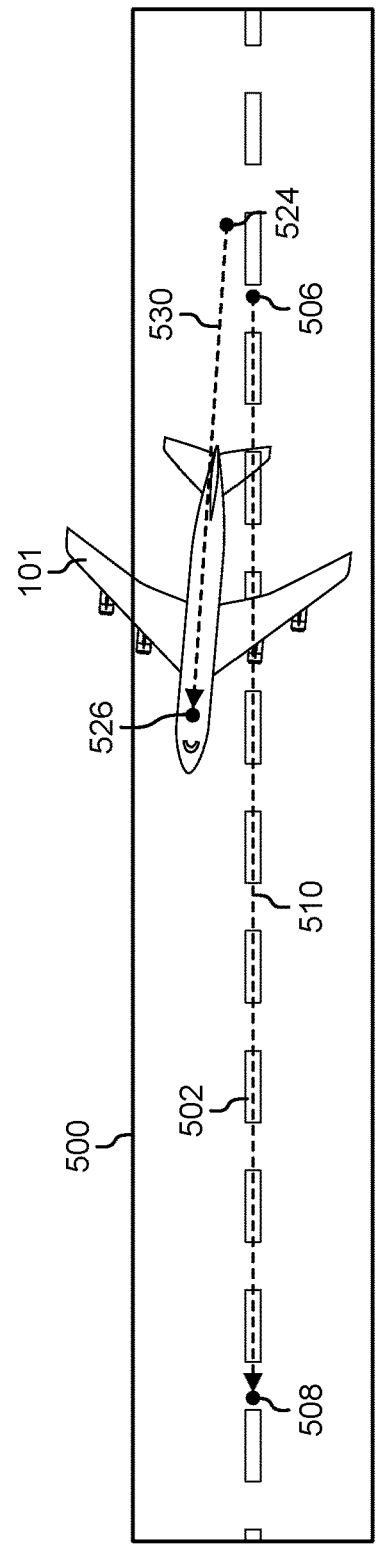
FIG. 5 is a top view schematic drawing of the aircraft illustrated in FIG. 4 during a takeoff operation.

Referring to FIG. 5, the survey of the runway 500 captures and stores the carrier phase values for each of the available GNSS measurements at the first position (e.g. the first position 506) and the second position (e.g. the second position 508). The survey processes the obtained carrier phase values to compute an intended path vector (e.g., the runway vector 510) that represents a straight line adjoining the first position 506 and the second position 508. Other runway survey data can be utilized in some embodiments. Runway end points are usually available from Jeppesen database. The runway endpoints are available in the database 200 in some embodiments.

The runway vector 510 is provided to the aircraft 101 or calculated by the navigation system 200 for use in two dimensional navigation and guidance operations. Though described herein with respect to navigational operations for the aircraft 101, it will be recognized that the systems and methodologies may be applied to any type of vehicle (e.g. a ground-based vehicle, a water-based vehicle, and the like) without departing from the inventive concepts disclosed herein.

Referring to FIG. 5, the aircraft 101 using the navigation system 200 (FIGS. 2 and 3) is positioned on the runway 500 facing in a direction of intended takeoff. The navigation system 200 (FIG. 2) is used to guide the aircraft during a take-off operation. The processing electronics 201 (FIG. 2) retrieves the runway vector 510 previously computed for the runway 500 from a vector database in the runway database 206 or the FMSs 330 and 332. Further, the processing electronics 201 determines GNSS carrier phases at an initial position 524 of the aircraft 101.

To retain the aircraft 101 within the bounds of the runway 500 during transit and takeoff, the processing electronics 201 provides one or more deviation signals to the displays 102 and HUDs 104 to guide the pilot toward the centerline 502 of the runway 500 (following the runway vector 510 connecting the first position 506 with the second position 508). In some embodiments, as the aircraft 101 moves forward down the runway 500, the processing electronics 201 of the navigation system 200 progressively computes a current position 526 of the aircraft 101 from the carrier phase or delta range GNSS measurements as described above. After computation of the current position 526 of the aircraft 101, the processing electronics 201 determines a current relative position vector 530 in some embodiments. The processing electronics 201 computes the shortest distance between current aircraft position 526 and runway centerline 502, and provide deviation information to the pilot to steer the aircraft 101 toward the runway centerline 502.

Figure 6:
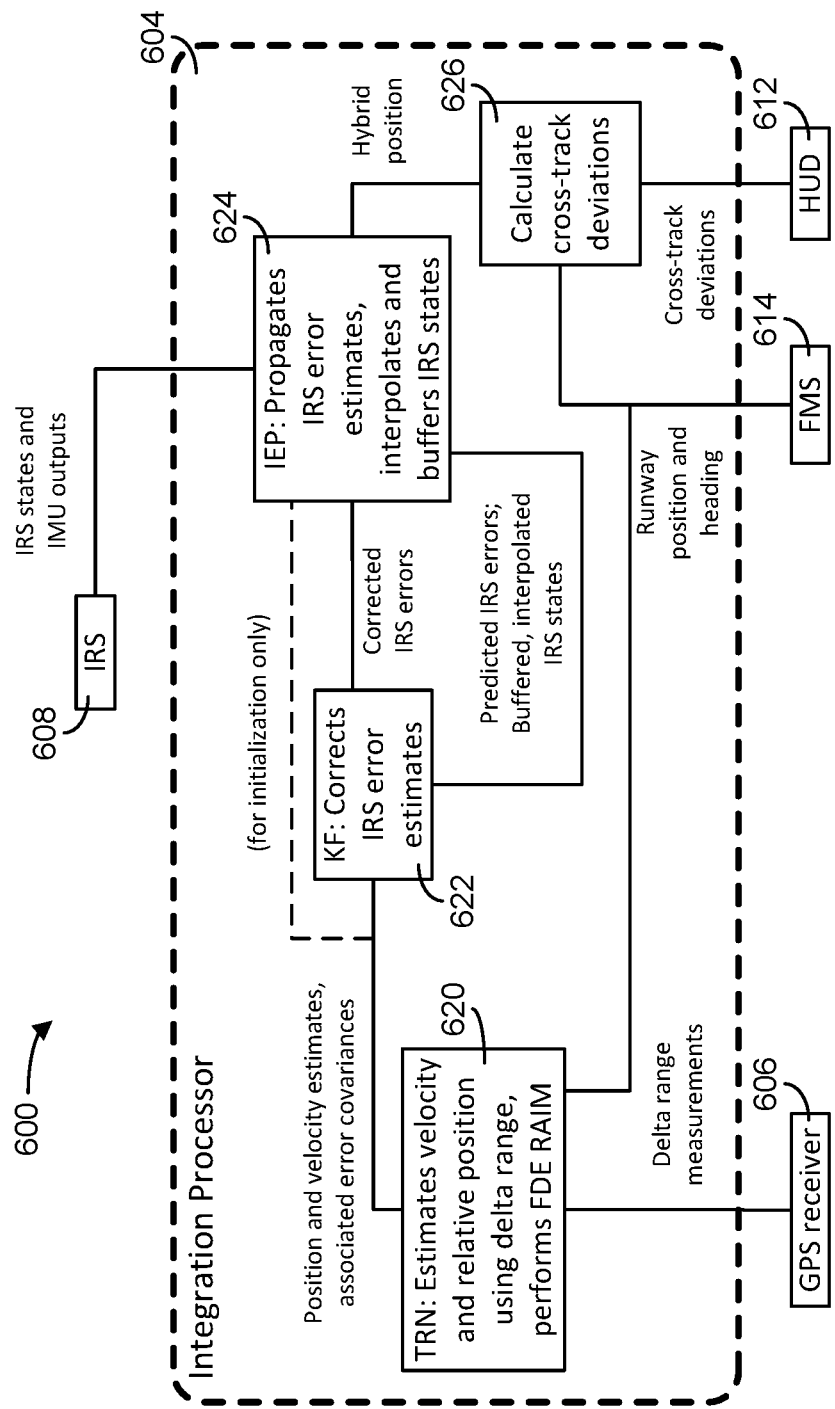
FIG. 6 is a block diagram of a navigation system for the aircraft cockpit illustrated in FIG. 1 according to some embodiments.

With reference to FIG. 6, a navigation system 600 is similar to the navigation system 200 and can be used as the navigation system 200 in the aircraft 101. The navigation system 600 includes a processor 604 similar to processing electronics 201 (FIG. 2). The navigation system 600 includes the processor 604, a GPS receiver unit 606, and IRS unit 608, a HUD 612 and an FMS 614. Although shown as single units 606 and 608 and a single FMS 614, the units 606 and 608 and the FMS 614 are each two or more units in some embodiments. The IRS unit 608 is similar to the IRS units 202 and the GPS receiver unit 606 is similar to the GNSS receiver units 204 (FIG. 2). The FMS 614 is similar to the FMSs 330 and 332 (FIG. 2).

The processor 604 is an integration processor that receives IRS states and inertial measurement unit (IMU) data from the IRS unit 608, runway position and heading information from the FMS 614 and delta range measurements from the GPS receiver unit 606. The processor 604 calculates cross track deviations for display on the HUD 612. The HUD 612 can be similar to the HUDs 104. The processor 604 includes a time relative navigation processor 620, an error estimator 622, an inertial error predictor 624, and a deviation calculator 626.

The time relative navigation processor 620, error estimator 622, inertial error predictor 624, and deviation calculator 626 are part of a high integrity hybrid navigation solution module, such as the modules 302 or 204 (FIG. 3) in some embodiments. The time relative navigation processor 620 estimates velocity and relative position using delta range measurements from the GPS receiver 606. The time relative navigation processor 620 can also perform FDE and RAIM processing. The time relative navigation processor 620 provides position and velocity estimates associated with error covariances to the error estimator 622.

The error estimator 622 includes a Kalman filter in some embodiments. The error estimator 622 corrects IRS error estimates in response to predicted IRS errors and buffered and interpolated IRS states from the inertial error predictor 624. The error estimator 622 provides corrected IRS errors to the inertial error predictor 624.

The inertial error predictor 624 provides a hybrid position to the deviation calculator 626 in response to the corrected IRS error data from the error estimator 622 and the IRS states and IMU data. The inertial error predictor 624 propagates IRS error estimates, performs error estimation, interpolation and buffering of IRS states in some embodiments.

The deviation calculator 626 calculates cross track deviations and provides the information related to the cross track deviations to the HUD 612. Deviation calculator 626 receives runway position and heading data from the FMS 614 and compares such data to the intended take-off path (e.g., the runway vector 510 (FIG. 6) to determine the deviation). Various positioning/mapping algorithms can be utilized to determine the deviation.

The runway position and heading information is also provided to the time relative navigation processor 620 from the FMS 614. At initialization, the time relative navigation processor 620 provides position and velocity estimates directly to the inertial error predictor 624 for setting initial IRS values and the initial hybrid position value.

In some embodiments, the time relative navigation processor 620 is coupled to two IRS units and confirms that IRS heading outputs agree while the IRS units perform gyrocompassing and the aircraft 101 is at the gate. In addition, the time relative navigation processor 620 ensures that sufficient velocity RAIM FDE coverage and horizontal relative position RAIM FDE coverage is expected to be provided for the next few minutes (e.g. using predictive RAIM check procedures). In addition, the navigation system 600 can determine that the maximum predicted time based upon takeoff performance calculations between 80 knots of ground speeds and lift off is less than a threshold while the aircraft 101 (FIG. 1) is at the gate.

Once on the runway 500 (FIG. 6), the pilot positions the nose wheel on the runway centerline 502 and aligns the aircraft 101 with the runway heading. The time relative navigation processor 620 confirms that true heading indications from the IRS unit 608 or a pair of IRS units agree with the surveyed runway heading from the runway positioning heading data from the FMS 614. The navigation system 600 compares whether the cross track velocity RAIM with cross track velocity protection level is below a threshold and whether it will be available for the next minute and confirms that no velocity RAIM fault is present. The navigation system 600 also determines that the cross track relative position error incurred over any forty second interval in the next one minute will be adequately low with a very high probability and that a sufficient subset of satellites is tracked. The navigation system 600 also determines if the horizontal protection level is less than a selected threshold or that the satellite based augmentation system (SBAS) and no position RAIM fault is present. While highly accurate absolute position is unnecessary for the time relative navigation concept, a crude upper bound on absolute position error (e.g. 1 nautical mile) is needed to ensure that line of sight vectors from aircraft GNSS antenna to the satellites are accurate enough for the time relative navigation problem. The navigation system 600 also determines that no faults of either GPS receiver unit 606 are detected and that the onside and cross-side IRS outputs agree. The navigation system 600 also determines whether no faults of either GPS units are detected and that outputs of the onside and cross-side receivers units agree.

When the pilot releases the brakes, the inertial error predictor 624 of the navigation system 600 sets initial hybrid position to the surveyed position of the runway start using data received from the FMS 614. During takeoff roll and prior to liftoff of the aircraft, the navigation system 600 calculates horizontal relative position and associated cross track containment bounds, calculates horizontal velocity and associated cross track containment bounds, and cross compares horizontal velocity and horizontal relative position between GPS receiver units. Time relative navigation processor 620 can employ a Kalman filter such as the Kalman filter associated with error estimator 622 for each IRS unit with delta position updates. The time relative navigation processor 620 can also run N-sub filters for each IRS unit with accumulated delta range updates for each satellite vehicle except one for each sub filter. The navigation system 600 monitors residuals for delta range updates for each filter and sub filter. The navigation system 600 predicts 99.9% bound on cross track coasting error at the time of liftoff if GPS is lost at the current time and continually calculates minimum groundspeed for which takeoff can proceed safely even in case of sustained loss of relative navigation guidance from GPS. Upon sustained loss of relative navigation guidance from GPS prior to reaching minimum safe ground speed, the time relative navigation processor 620 can request an aborted takeoff and provide such information to the HUD 612. A sustained loss of relative navigation guidance from GPS means a loss of validated relative horizontal position updates for more than three seconds in some embodiments.

Figure 7:
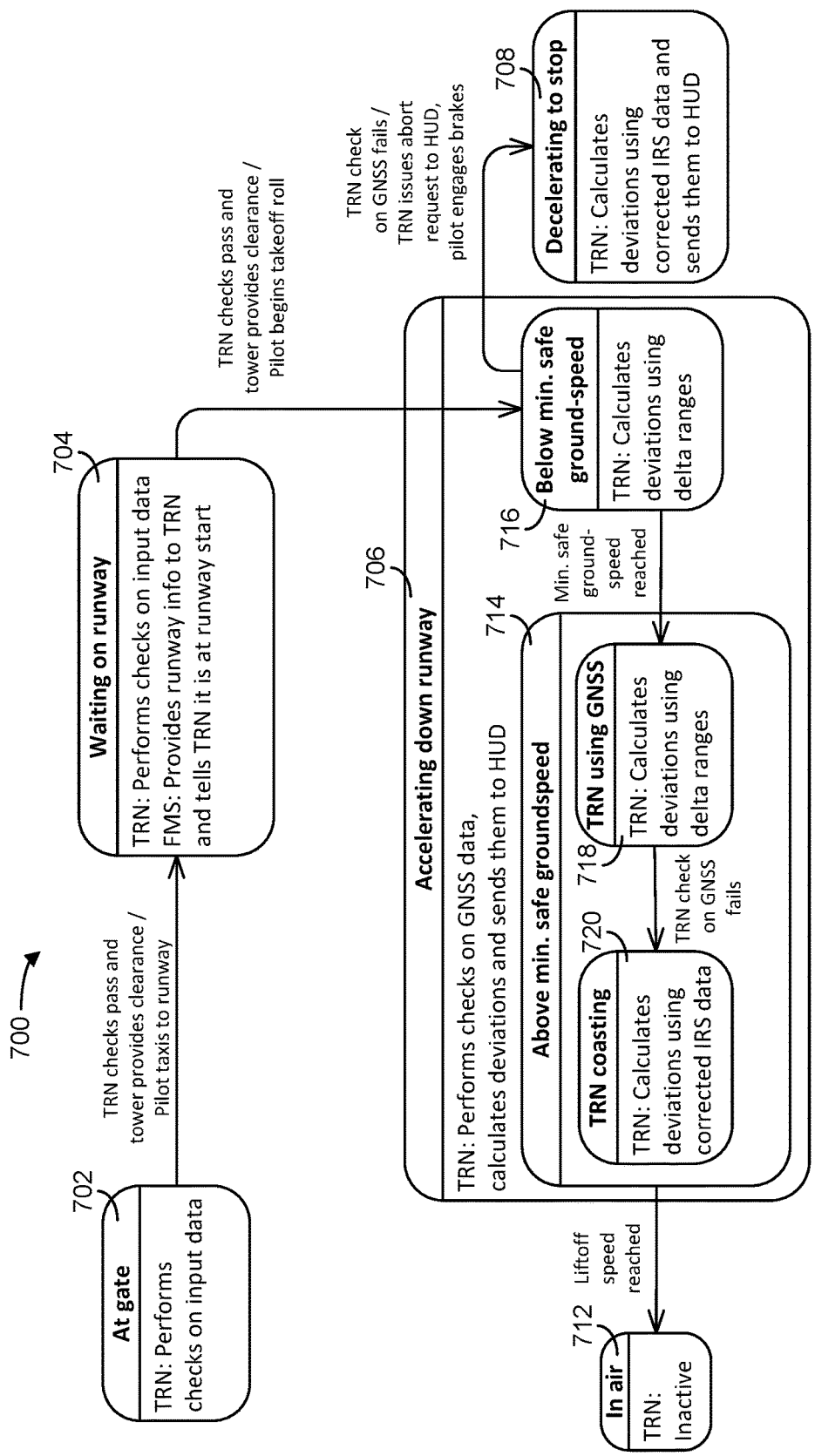
FIG. 7 is a state diagram for the navigation systems illustrated in FIG. 2 or 6 during a takeoff procedure according to some embodiments.

With reference to FIG. 7, a state machine for the navigation systems 200 and 600 includes an at gate state 702, a waiting on runway state 704, an accelerating down the runway state 706, a decelerating to stop state 708, and an in air state 712. In the at the gate state 702, the navigation systems 200 and 600 perform checks on input data. If the checks pass and tower provides clearance the pilot taxis to the runway 500 (FIG. 5) and the waiting on runway state 704 is reached. The checks can be performed by the time relative navigation processor 620 in some embodiments.

In the waiting on runway state 704, the navigation systems 200 or 600 can perform checks on input data and the FMSs 222 and 614 can provide runway information to the processing electronics 201 or the processor 604. The FMSs 222 or 614 can also provide an indication to processing electronics 201 or the processor 604 that the aircraft 101 is at a runway start. If the checks are passed and the tower provides clearance, the pilot can begin roll off and the accelerating down the runway state 706 is reached. In the state 706, navigation systems 200 and 600 perform checks on GPS data and calculate deviations and sends them to the HUDs 104 or 612. An aircraft above minimum safe ground speed sub state 714 and a below minimum safe ground speed sub state 716 are within the accelerating down runway state 706. The sub state 714 includes a time relative navigation using GNSS sub state 718 and a time relative navigation coasting sub state 720.

When the aircraft 101 begins roll off, the navigation systems 200 and 600 are in the sub state 716. If the aircraft 101 is below a minimum safe groundspeed, navigation systems 200 and 600 calculate deviations using delta ranges. When the aircraft exceeds the minimum safe ground speed, the sub state 718 of the sub state 714 is reached.

If the navigation systems 200 and 600 detect a GPS failure in the sub state 716, the navigation systems 200 and 600 issue an abort request to the HUDs 104 or HUD 612 and the pilot engages brakes and enters decelerating to a stop state 708. During the state 708, the navigation systems 200 and 600 calculate deviations using corrected IRS data and sends them to the HUDs 104 or HUD 612.

If the minimum safe groundspeed is reached from the sub state 716, the navigation systems 200 and 600 enter the sub state 714. In the sub state 714, the navigation systems 200 and 600 calculate deviations using delta ranges and if there is a failure associated with GPS data, the time relative navigation coasting sub state 720 is reached from the sub state 718. In the sub state 720, navigation systems 200 and 600 calculate deviations using corrected IRS data. If the lift off velocity is reached in the sub state 714, the in air state 712 is reached and navigation system 200 and 600 can become inactive.

Figure 8:
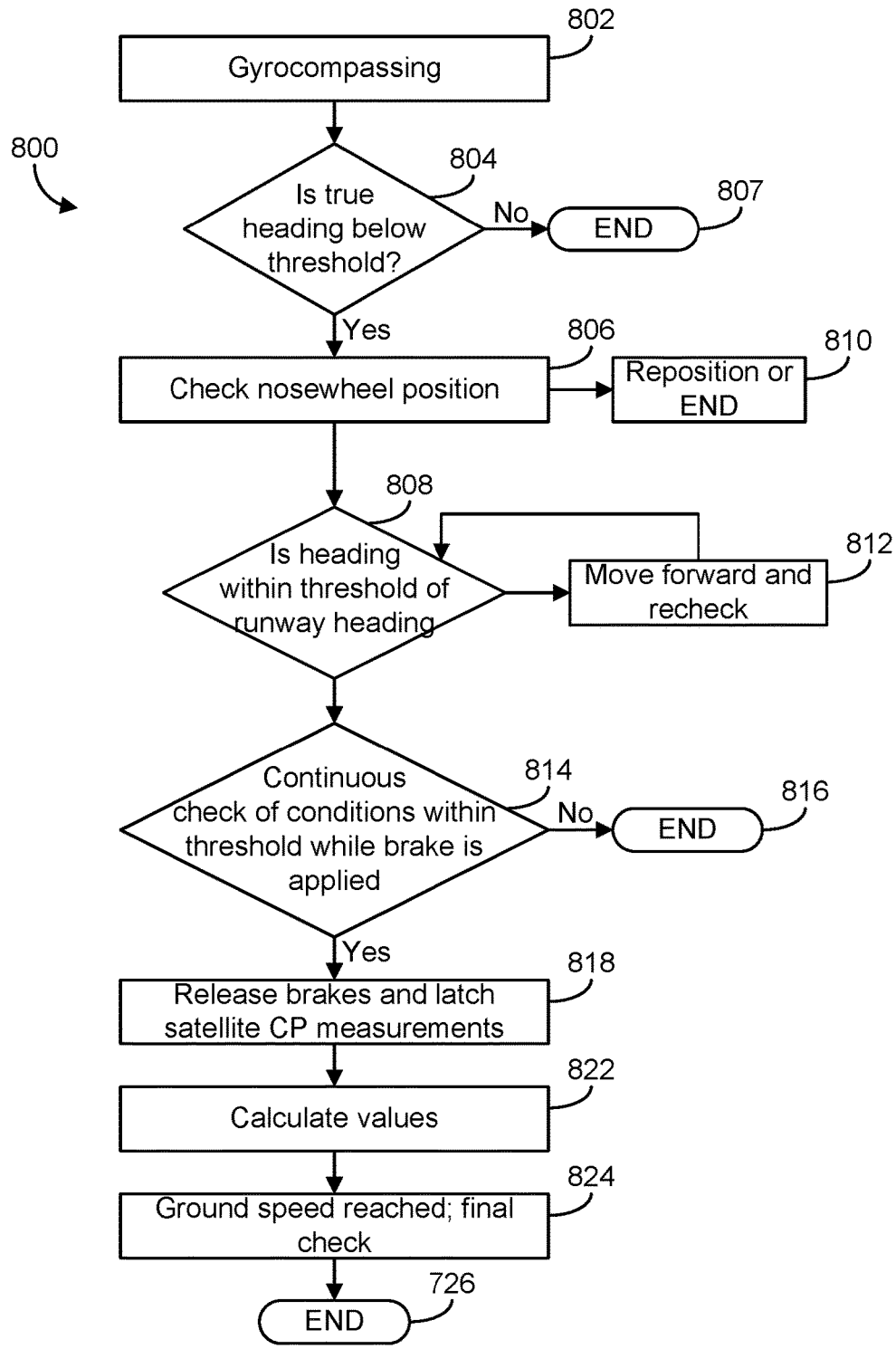
FIG. 8 is a flow diagram of a takeoff procedure using the navigation systems illustrated in FIG. 2 or 6 according to some embodiments.

According to some embodiments, the aircraft 101 operates according to a procedure 800 discussed below with reference to FIG. 8. Navigation system 200 or 600 can be used in the procedure 800. According to some embodiments, prerequisites for the procedure 800 include:

1. A runway 500 with surveyed endpoints of the centerline 502 (FIG. 5);
2. Runway visual range (RVR) of greater than 150 ft. If EFVS is used, then an "effective" RVR, which takes into account visibility provided by EFVS, has to be at or above 150 ft. In some embodiments, the RVR threshold is set based on pilot's ability to accurately and reliably position the aircraft 101 on the runway centerline 502 before starting takeoff. While RVR of 150 ft. is considered to be sufficient to position the aircraft 101 accurately on the runway centerline 502 before takeoff, it is not considered sufficient to maintain aircraft 101 on the centerline 502 during takeoff roll. For airline operations, FAA requires 600 ft. RVR for takeoff without aids.
3. Runway width of greater than 150 ft.
4. Aircraft wheelbase (distance between outer rims of left-most and right-most wheels) less than 50 ft.
5. Single or dual IRS units (such as IRS units 306 and 308) or a high end gyrocompassing attitude and heading reference system (AHRS).
6. Dual GNSS receivers with L1 carrier phase output, at a minimum (such as GPS receiver units 312 and 314). In some embodiments, GNSS receivers do not output L1 carrier phase measurements, but provide delta range, which may be internally computed as time differenced carrier phase. The integrated delta range measurement from the time when takeoff was initiated is equivalent to time differenced carrier phase in some embodiments.
7. Each IRS unit is aligned to a common aircraft body frame within 0.2 degree accuracy in pitch and roll (worst case), and 0.3 degrees in heading (worst case).

The above prerequisites are exemplary. Prerequisites can be removed or added based upon equipment capabilities and environment considerations.

The procedure 800 is described below with reference to the navigation system 200 and includes a step 802 in which the IRS units 306 and 308 perform gyrocompassing while the aircraft 101 is at the gate. The true heading is determined with an accuracy of 0.4 degree, 95%, according to ARINC 704-4 specification in some embodiments. Prior to the aircraft 101 leaving the gate, the two IRS heading outputs are checked for agreement within the initial IRS heading split degree threshold (about 1.3 degrees in some embodiments) in a step 804. If the two IRS heading outputs agree to within the initial IRS heading split degree threshold, the procedure 800 advances to a step 806. Otherwise, the procedure 800 the operation is ended or the aircraft 101 is repositioned at a step 807.

Assuming IRS boresight alignment to the common aircraft reference axis in heading follows a normal distribution with zero mean and standard deviation of 0.1 degrees, and IRS heading error (after gyrocompassing is completed) follows normal distribution with zero mean and standard deviation of 0.2 degrees, a cross-compare threshold of 1.3 degrees results in greater than 99.99% availability. In addition, while at the gate, the FMSs 330 and 332 check that: 1) a sufficient velocity receiver autonomous integrity monitoring (RAIM) fault detection and exclusion (FDE) coverage is provided for the next gate check RAIM prediction time in minutes; and 2) sufficient horizontal relative position RAIM FDE coverage exists for the next gate check RAIM prediction time in minutes. A maximum predicted time, based on takeoff performance calculations, between 80 knots of ground speed and liftoff is less than 13 seconds. FDE RAIM checks at the gate use information about the current constellation from the most recent available almanac. These checks may take into account terrain database information so that satellite masking by terrain features when aircraft is on the runway 500 is accounted for when satellites are not visible at the gate due to masking by ground structures.

After rolling out from the taxiway onto the runway 500, the pilot positions the nose wheel on the centerline 502 of the runway 500 at a step 806. The centerline 502 has to be visible, given conditions of RVR>150 ft. The nose wheel center is positioned on the centerline 502 of the runway 500 which a pilot is capable of achieving within 1 meter, worst case. The nose wheel camera 208 can be used to assist in the step 806. If the nose wheel center is not within 1 meter of the centerline 502, the aircraft 101 is repositioned or the procedure 800 is ended at a step 81. In some embodiments, a synthetic vision image is overlaid on an enhanced flight vision system image on the head up display or on the head down display or multiple of head down displays or head up displays to confirm the camera image (EFVS) to the flight crew is not misleading.

At a step 808, the runway heading is derived from the database of the surveyed ends of the runway 500. Each end has to be surveyed with 1 meter worst case bound (ICAO Standard+/−1 meter, $10^{-8}$ probability that error is greater than 1 meter) on the cross track error. The runway true heading is compared to the heading from each IRS unit 306 and 308. If a discrepancy higher than a maximum initial runway heading deviation (e.g., 2 degrees) exists, the pilot moves the aircraft 101 forward, keeping the nose wheel on the centerline 502 within the tolerance described above, until the discrepancy of each IRS unit 306 and 308 and from the surveyed runway heading is within maximum initial runway heading deviation in a step 812 or the procedure 800 is ended. At this point in the procedure 800, the aircraft 101 is considered to be sufficiently accurately positioned on the centerline 502 of the runway 500 at a step 814.

At the step 814, the following conditions are checked continuously while the aircraft 101 is stopped on the runway 500 until brakes are released: 1) cross track velocity RAIM with cross track velocity protection level less than 0.3 m/sec is available for the next 1 minute; 2) probability of failed exclusion less than 0.001 exists, 3) probability of wrong exclusion is less 0.001; 4) no velocity RAIM fault is present; 5) cross track relative position error incurred over any 40 second interval during the next 1 minute is predicted and does not to exceed 5 meters with 10-7/hr. integrity (this is an FDE RAIM function for time relative cross track position error, using time differenced carrier phase measurements); 6) probability of failed exclusion for the next 1 minute is less than 0.001; 7) probability of wrong exclusion is less than 0.001; 8) a sufficient subset of satellites for the cross track relative position FDE RAIM with cross-track protection and exclusion levels below 5 meters is tracked (satellites need to be above the mask angle, and have high enough C/No value with adequately low probability of cycle slips of no more than 10-4/hr./channel); 9) a horizontal protection level of less than 3 nm or a satellite-based augmentation system (SBAS) is available or horizontal position reported by the GPS units 312 and 314 is within 0.3 nm of the surveyed location, and no position RAIM fault is present; 10) each IRS heading value is within maximum initial runway heading deviation of the runway heading; 10) no faults of either IRS unit 306 or 308 are detected, and outputs of on-side (OS) and cross-side (XS) IRS units 306 and 308 are in agreement; and 11) no faults of either GPS units 312 and 314 are detected, and outputs of OS and XS receivers are in agreement. If any condition above fails, the procedure 800 ends or condition are rechecked at a step 816.

When the brakes of the aircraft 101 are released, carrier phase (CP) measurements from all available satellites are latched at a step 818, or integrated delta range measurement for each satellite is set to zero. Initial IRS position is set to the surveyed position of the corresponding runway end point. At a step 822, during takeoff roll the following calculations are performed: 1) horizontal velocity FDE RAIM and horizontal velocity calculation; 2) horizontal relative position FDE RAIM and horizontal relative position calculation; 3) horizontal velocity and horizontal relative position cross compare between the GPS units 312 and 314; 4) a full Kalman filter operation for each IRS unit 306 and 308 with delta position updates is performed (each IRS unit 306 and 308 is operating open loop without any feedback in some embodiments); 5) N sub filters for each IRS unit 306 and 308 with time differenced carrier phase (TD CP) updates for each satellite (except one for each sub filter may not be used in some embodiments); 6) residual monitoring for TD CP updates for each filter and sub filters (provides additional fault exclusion); and 7) prediction of 99.9% bound on cross track coasting error at the time of liftoff if GPS is lost at the current time. When the cross track coasting error at the time of liftoff value is below an allocation for maximum cross track estimation error, a flag is shown that takeoff may continue even if GPS is lost. Alternatively, a flag is only shown if takeoff should not continue.

Upon reaching maximum safe abort ground speed (e.g., 80 knots), a final check is made whether safe takeoff is expected to occur with 99.9% confidence if GPS is lost at that point at a step 824. If 99.9% confidence is not achieved at that point, a takeoff abort is initiated at a step 826, otherwise takeoff is continued. Since GPS loss is an unlikely event, 99.9% confidence is sufficient. Additional checks may be introduced prior to reaching safe abort ground speed in some embodiments. For example, takeoff is aborted prior to reaching safe abort ground speed if: 1) a horizontal relative position RAIM fault is detected but not excluded by either RAIM FDE or exclusion mechanisms in the hybrid solution (due to RAIM check prior to brake release probability of this event should be less than $10^{-8}$ per takeoff, when exposure time is taken into account); 2) horizontal velocity RAIM fault is detected but not excluded by either RAIM FDE or exclusion mechanisms in the hybrid solution (due to RAIM check prior to brake release probability of this event should be less than $10^{-8}$ per takeoff, when exposure time is taken into account); 3) solution separation detects a fault, which is not excluded; 4) a fault of either IRS units 306 and 308 is detected (based on IRS MTBF of 10,000 hours and exposure time of 30 seconds, probability of this event is $5\times10^{-6}$ per takeoff); 5) a fault of either GPS unit 312 and 314 is detected (based on GPS receiver MTBF of 10,000 hours; and 6) exposure time of 30 seconds, probability of this event is $5\times10^{-6}$ per takeoff). If a cycle slip is detected and excluded, it is possible to restart relative navigation from that point in time, re-incorporating the satellite into the solution after the epoch in which cycle slip was detected and excluded. However, since it may be difficult to differentiate between a cycle slip and a satellite fault, it may be preferable to stop using this satellite. If C/No threshold is set such that probability of cycle slip is no greater than $10^{-4}$/hr/satellite, and there are 10 satellites in view, probability of cycle slips on two different satellites during takeoff roll prior to reaching safe abort speed is less than $10^{-8}$. Similar consideration can be given to carrier phase signal in space fault, which is detected and excluded. The corresponding satellite does not need to be re-incorporated into the solution.

A mechanism for detecting and excluding cycle slips can be employed for enhanced reliability. This can be done using residual monitoring, and if a dual frequency GNSS receiver is available, using cross-frequency carrier phase check. For example, if L1 frequency is spoofed or jammed, the algorithm may use L5 carrier phase only.

Figure 9:
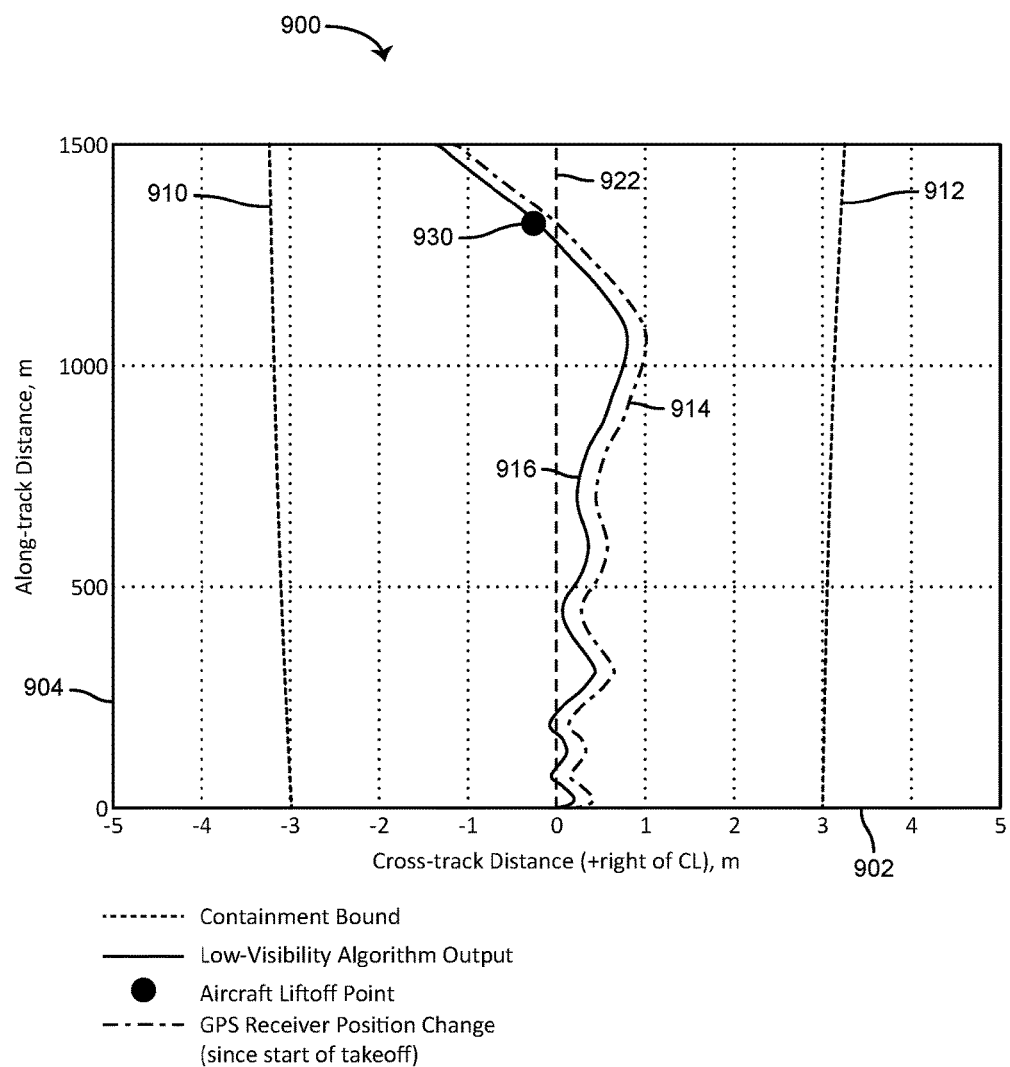
FIG. 9 is a chart showing test results for the takeoff procedure using the navigation systems illustrated in FIG. 2 or 6.
Figure 10:
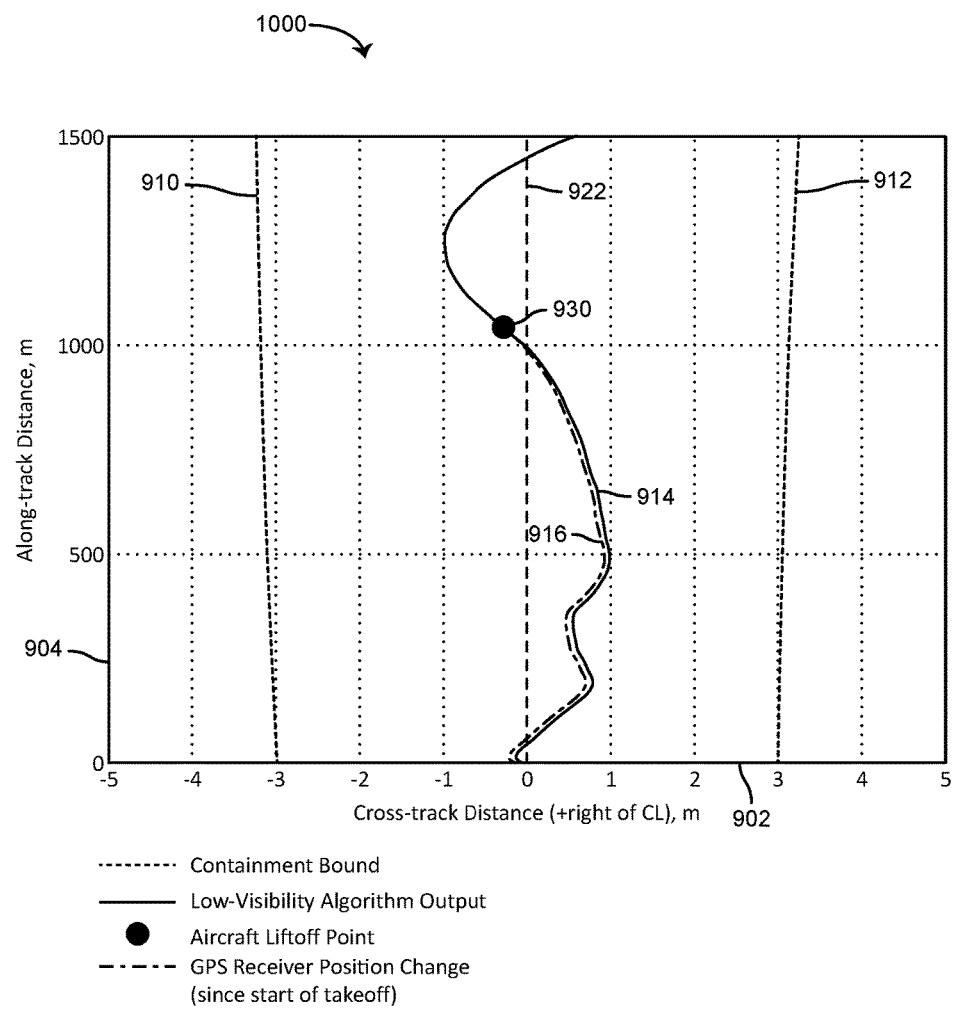
FIG. 10 is a chart showing test results for the takeoff procedure using the navigation systems illustrated in FIG. 2 or 6.
Figure 11:
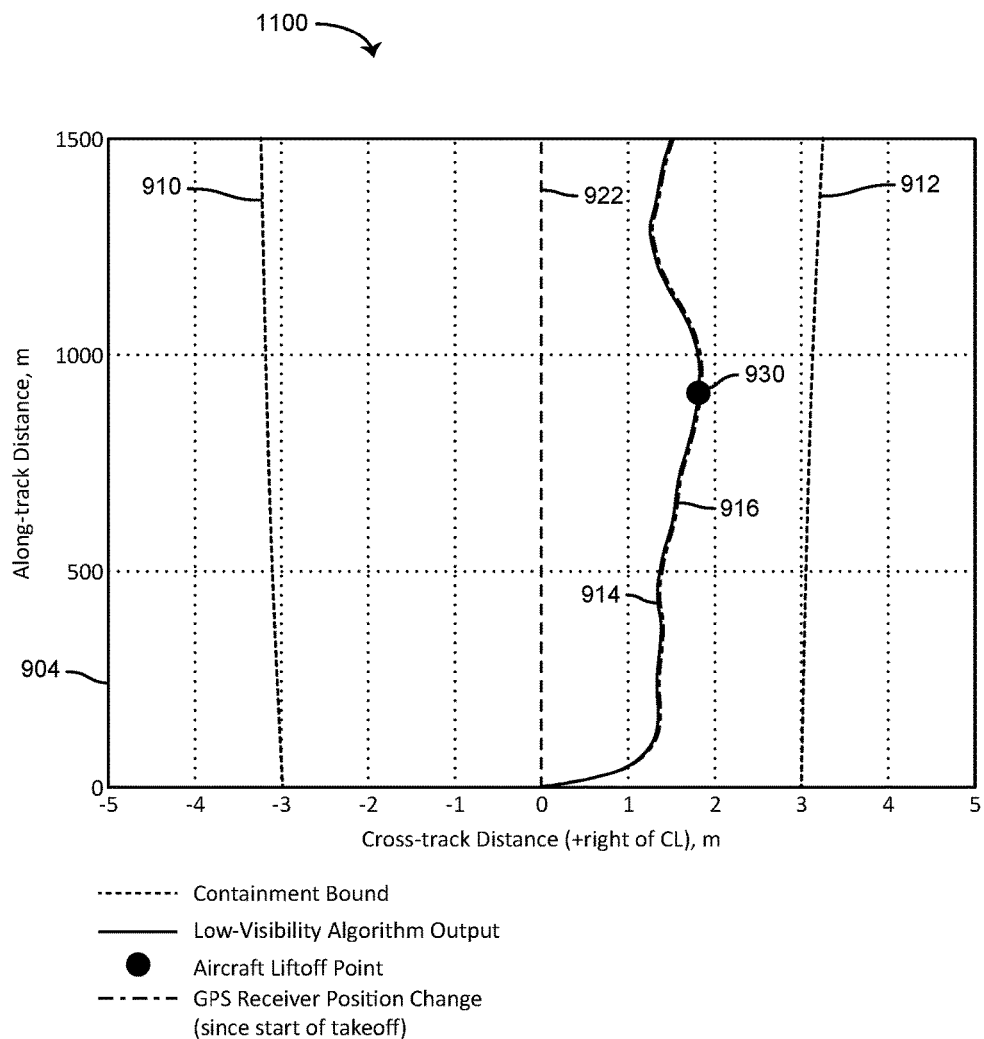
FIG. 11 is a chart showing test results for the takeoff procedure using the navigation systems illustrated in FIG. 2 or 6.

With reference to FIGS. 9-11, flight test results 900, 1000, and 1100 using navigation systems 200 or 600 are provided on an X-axis 902 showing cross track distance and a Y-axis 904 showing along track distance. Curves 910 and 912 show containment boundaries, and a curve 914 shows GPS position. A curve 916 shows the output of the navigation systems 200 or 600 position calculation, and a line 922 represents the centerline 502 of the runway. A deviation between the line 922 and the positon calculated by the navigation systems 200 or 600 is shown by comparing the curves 916 and the line 922. A lift-off point 930 of the aircraft 101 is provided on the curve 916.

The flight test results 900, 1000, and 1100 are at different runways. In all three results 900, 1000 and 1100, the containment boundary remains below 3.3 meters prior to takeoff. In the results 900 and 1000 the total cross track error, as computed by the time relative navigation algorithm, remains below 1 meter prior to takeoff. In the result 1100, the total error remains below 2 meters. There is an offset of roughly 1.5 meters, acquired shortly after initiation of take-off roll. The offset is likely due to the pilot positioned the aircraft 101 initially 1.5 meters to the left of the runway centerline 502, and corrected this offset shortly after initiation of the takeoff roll.

While described above in the context of use of carrier phase measurements of GNSS satellites in vehicle navigation, GNSS velocity measurements may be computed based on such carrier phases differenced over short time segments (e.g. 1 second or less). As such, the present disclosures fully contemplate the use of such GNSS velocity measurements derived from carrier phases to perform vehicle navigation operations similar to those described herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which could be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A method of taking off a runway in low visibility conditions, the method comprising:
   visually confirming a position of a nose wheel of an aircraft laterally within close proximity of a runway centerline of the runway;
   determining a runway vector heading for the runway from runway data;
   comparing the runway vector heading to heading indications from a plurality of inertial reference systems;
   determining carrier phase or delta range measurements from a global navigation satellite system;
   confirming a probability of exclusion associated with the global navigation satellite system is less than a threshold before taking off; and
   setting an initial takeoff position for each inertial reference system to a position on the runway centerline at where the aircraft is located after visual confirmation by a pilot that the aircraft is on the runway centerline and using the carrier phase or delta range measurements and the initial takeoff position to determine a horizontal deviation when taking off.

2. The method of claim 1, further comprising:
   computing, by a processor during travel along the runway, a minimum cross track deviation distance between a current position and the runway centerline.

3. The method of claim 1, further comprising:
   displaying the horizontal deviation between a current position and the runway centerline.

4. The method of claim 3, further comprising:
   displaying the horizontal deviation representing distance between the current position and an intended path of a vehicle.

5. The method of claim 1, wherein brakes are released after latching the carrier phase measurements or the delta range measurements, or setting an integrated delta range value to zero for each visible satellite.

6. The method of claim 5, wherein engines are commanded to maximum thrust or takeoff thrust before the brakes are released.

7. The method of claim 1, further comprising:
   comparing horizontal velocity and relative position calculated by a plurality of GNSS receivers.

8. The method of claim 1, wherein a nose wheel camera is used to check the position of the nose wheel; or
   a second camera configured to present an enhanced flight vision system image on a head up display and on a head down display is used to check the position of the nose wheel.

9. The method of claim 8, wherein a synthetic vision image is overlaid on the enhanced flight vision system image on the head up display or on the head down display to confirm a camera image for the nose wheel camera or the second camera is not misleading.

10. A navigation system comprising:
    a processing system configured to determine a first navigation solution and second navigation solution, the first navigation solution provides a first horizontal deviation using a first inertial reference system and a first global navigation satellite system receiver, the second navigation solution provides a second horizontal deviation using a second inertial reference system and a second global navigation satellite system receiver, wherein the first navigation solution and the second navigation solution determine a position derived from the respective first and second inertial reference system and an error prediction derived from at least one of the first and second global navigation satellite system receivers to calculate the first horizontal deviation and the second horizontal deviation, wherein the processing system determines a lateral deviation from an intended path during takeoff using the first horizontal deviation and the second horizontal deviation, wherein the processing system confirms a probability of exclusion associated with the first global navigation satellite system receiver and the second global navigation satellite system receiver is less than a threshold before the takeoff.

11. The navigation system of claim 10, wherein the processing system is configured to latch carrier phase measurements from the first and second global navigation satellite system receivers or set initial value of integrated delta range measurement for each satellite to zero when brakes are released prior to the takeoff.

12. The navigation system of claim 10, wherein the processing system is configured to set an initial takeoff positon for each inertial reference system or a single inertial reference system to a surveyed position at a runway end prior to the takeoff.

13. The navigation system of claim 10, wherein the processing system is configured to calculate the first horizontal deviation using the position.

14. The navigation system of claim 10, further comprising:
    a first head up display configured to display first or second information related to the respective first or second navigation solution and a head down display or head down displays configured as primary flight displays and configured to display the first or second information related to the first or second navigation solution.

15. The navigation system of claim 10 wherein the processing system receives a runway vector heading from a flight management system for calculating the first or second deviation and, wherein the first and second global navigation satellite systems receivers are global positioning system receivers.

16. The navigation system of claim 10 wherein the first or second navigation solution is used for positioning of a synthetic vision system image.

17. A processing system for a navigation system of an aircraft, comprising:
- a cross tracker configured to provide a cross track deviation using a hybrid relative positon and runway heading data;
- an error processor configured to provide the hybrid relative positon using inertial reference system data and corrected error data; and
- an error estimator configured to provide the corrected error data using estimates derived from delta range data from a global navigation satellite system receiver, wherein the processing system determines a lateral deviation from an intended path during takeoff using the corrected error data, wherein the lateral deviation is determined without using the global navigation satellite system receiver in event of an error of the global navigation satellite system receiver and if a speed of the aircraft is above a threshold during the takeoff when the error is detected.

18. The processing system of claim 17, further comprising:
- a time relative navigation estimator configured to provide the estimates derived from the delta range data from the global navigation satellite system receiver.

19. The processing system of claim 18, wherein the error processor comprises a Kalman filter and the time relative navigation estimator performs receiver autonomous integrity monitoring (RAIM) fault detection and exclusion (FDE).

20. The processing system of claim 18, wherein the hybrid relative positon is initially determined using a positon provided from the time relative navigation estimator without modification by the error processor.

* * * * *